E. KEMPSHALL.
NON-SKID TIRE.
APPLICATION FILED NOV. 5, 1907.

928,868.

Patented July 20, 1909.

Witnesses
Inventor
E. Kempshall
Atty.

UNITED STATES PATENT OFFICE.

ELEAZER KEMPSHALL, OF LONDON, ENGLAND, ASSIGNOR TO KEMPSHALL TYRE COMPANY, OF EUROPE, LIMITED, OF LONDON, ENGLAND.

NON-SKID TIRE.

No. 928,868.  Specification of Letters Patent.  Patented July 20, 1909.

Application filed November 5, 1907.  Serial No. 400,784.

*To all whom it may concern:*

Be it known that I, ELEAZER KEMPSHALL, a citizen of the United States of America, and residing at the Hotel Russell, London, W. C., England, have invented certain new and useful Improvements in Non-Skid Tires, of which the following is a specification.

This invention relates to tires for vehicle wheels and particularly to non-skid tires for motor propelled vehicles, cycles and the like.

It is well known that a pneumatic or other rubber tire having a continuous flat tread surface, which surface is approximately parallel to the road when the wheel is under load is not so apt to skid or slip sidewise as one with the usual round or cylindrical surface, but it has the disadvantage that the stresses due to the load are transmitted to the sides of the tire near the rim which parts are subjected to considerable bending in consequence, and very soon become weakened and begin to split or give way all around the tire near the rim.

The object of the present invention is to provide a pneumatic or other rubber tire with a tread surface possessing the advantages of the continuous flat tread surface, but which avoids the above mentioned disadvantages, and which further enables recesses or the like to be provided in the tread at intervals so that a suction action can be set up to increase the resistances to skidding.

It has already been proposed to provide recesses over the tread surface of tires having an approximately cylindrical surface, but according to the present invention recesses are provided in distinct studs having flat tread surfaces; it is possible to arrange that several studs are simultaneously in contact with the road surface when the tire is under load and owing to their configuration they can make correct contact with the ground and insure a good grip for the tire.

The tread surface according to the present invention is formed with a series of circular or polygonal flat surfaces or studs which are supported from the normally cylindrical or like tire in such a manner that they do not transmit the stresses to the sides of the tire near the rim in a continuous circle, but that said stresses are distributed over the sides of the tire on waving or non-circular lines so that the tendency to form a weakened continuous line to split is avoided. The flat tread surfaces of the studs are preferably provided with recesses as before referred to, but some or all of them may be plain, grooved or figured in any desired manner.

The accompanying drawings illustrate several forms of the invention.

Figure 1:
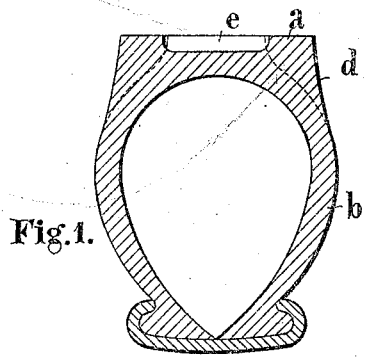
Figure 2:
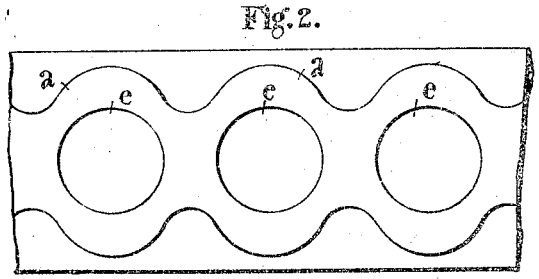
Figure 3:
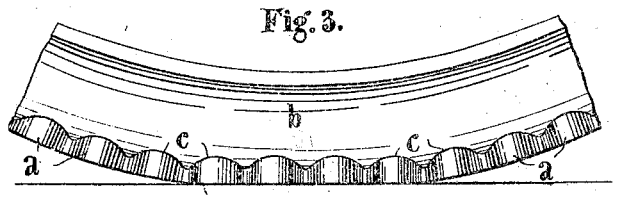
Figure 4:
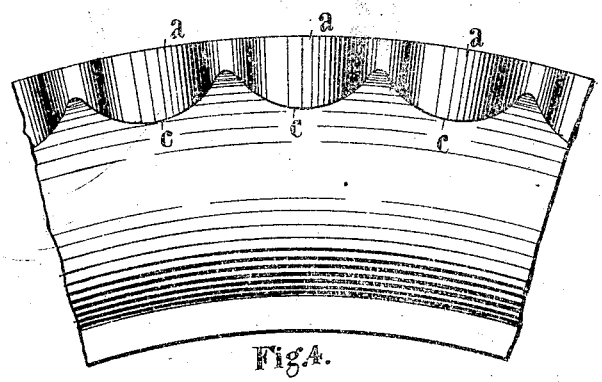
Figure 5:
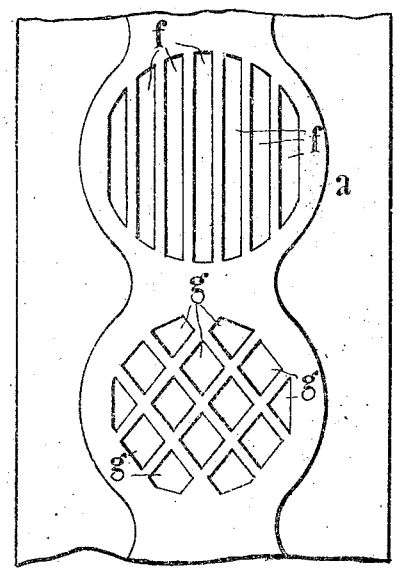
Figure 6:
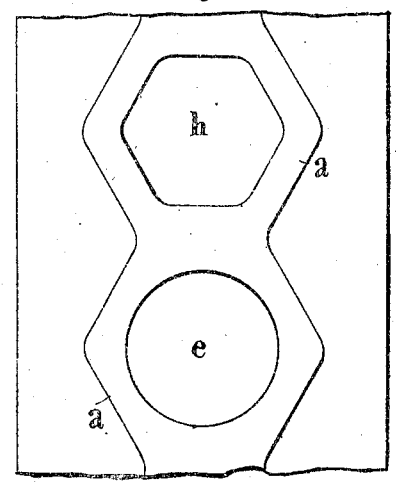

Figure 1 is a cross section of one form of tire having a series of approximately circular studs provided with circular recesses; Fig. 2 being a plan of part of a tire corresponding thereto; Fig. 3 illustrates in side elevation the lower part of a tire under load, illustrating the manner in which several studs are forced into contact with the road surface simultaneously; Fig. 4 is a side elevation of part of a tire similar to that illustrated in Figs. 1 and 2; Figs. 5 and 6 are plans illustrating further forms of studs.

In carrying out the invention according to one mode a series of approximately circular studs, *a*, having flat tread surfaces are formed on the tire. The studs are arranged to interpenetrate with the tire proper, *b*, on non-circular or wavy lines, *c*, so that the stresses are distributed over the sides of the tire and are not restricted to continuous circular lines as would be the case if a continuous flat tread were employed. The sides, *d*, of the studs are made of a fairly rigid nature so as to firmly resist compression in order to maintain the tread surfaces of the studs, *a*, flat and in contact with the road when a tire is under load and to adequately transmit the stresses to the tire proper, *b*. The studs in one form are provided with circular recesses, *e*, which when the tire is under load as illustrated in Fig. 3, act as suction chambers and greatly increase the resistance of the tire to side slipping or skidding. It is preferred to arrange the studs, *a*, close enough together to enable three or four of the studs to be in contact with the road simultaneously when the tire is under load as illustrated in Fig. 3.

The series of studs, *a*, present excellent non-skidding tread surfaces and these surfaces may be provided with circular recesses, *e*, as before described, or they may be grooved as at *f*, Fig. 5, or have a number of cells, *g*, as shown in the same figure; or the surfaces may in some cases be left plain. The studs instead of being approximately circular as above described, may be polygonal, for instance, they may be of the approximately hexagonal form shown in Fig. 6, in which case the tread surfaces may have circular recesses, $e$, hexagonal recesses, $h$, or any other form, as before described.

The inner walls of the depressions $e$, are at right angles to a horizontal line drawn through the center of the tire. The purpose of this construction is to prevent spreading and consequent breaking of the material from which the tire is constructed, when load pressure is applied.

Having now described my invention, what I claim as new and desire to secure by Letters Patent is:—

1. A tubular tire, comprising a body portion formed on its outer edge with a plurality of projections formed in their center portions with depressions, the inner walls of the depressions being at right angles to a horizontal line drawn through the center of the tire, the outer sides of the projections being slightly inclined toward each other and merging into the side walls of the body of the tire on non-circular lines, the edges of the projections adjacent the depressions being substantially parallel with a line drawn through the tire, the projections being connected by ridges the outer walls of which are at right angles to a line drawn through the center of the tire, the body portion, projections and ribs being formed in one piece.

2. A tubular tire comprising a body portion formed on its outer edge with a plurality of projections formed in their centers with a plurality of depressions at right angles to a horizontal line drawn through the center of the tire, the outer sides of the projections being slightly inclined toward each other and merging into the side walls of the body of the tire on non-circular lines, the projections being connected by ridges, the outer walls of which are at right angles to a line drawn through the center of the tire.

In testimony whereof I have signed my name to this specification in the presence of two subscribing witnesses.

ELEAZER KEMPSHALL.

Witnesses:
A. W. MATHYS,
B. H. MATTHEWS.